US008681691B2

(12) United States Patent
Shen et al.

(10) Patent No.: US 8,681,691 B2
(45) Date of Patent: Mar. 25, 2014

(54) BASE STATION INITIATED PROXIMITY SERVICE DISCOVERY AND CONNECTION ESTABLISHMENT

(75) Inventors: Hui Shen, Sammamish, WA (US); Thomas W. Kuehnel, Seattle, WA (US); Yi Lu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1281 days.

(21) Appl. No.: 11/880,971

(22) Filed: Jul. 25, 2007

(65) Prior Publication Data

US 2009/0029691 A1    Jan. 29, 2009

(51) Int. Cl.
*H04W 4/00* (2009.01)
(52) U.S. Cl.
USPC .......................................................... 370/328
(58) Field of Classification Search
None
See application file for complete search history.

(56) References Cited

U.S. PATENT DOCUMENTS

| | | | |
|---|---|---|---|
| 6,532,368 B1 | 3/2003 | Hild et al. |
| 6,603,744 B2 | 8/2003 | Mizutani et al. |
| 6,633,757 B1 | 10/2003 | Hermann et al. |
| 6,659,947 B1 | 12/2003 | Carter et al. |
| 6,728,232 B2 | 4/2004 | Hasty, Jr. et al. |
| 6,763,014 B2 | 7/2004 | Kennedy |
| 6,842,460 B1 | 1/2005 | Olkkonen et al. |
| 6,892,052 B2 | 5/2005 | Kotola et al. |
| 6,909,706 B2 | 6/2005 | Wilmer et al. |
| 6,952,715 B1 | 10/2005 | Kronz |
| 6,957,086 B2 | 10/2005 | Bahl et al. |
| 6,961,560 B2 | 11/2005 | Hermann et al. |
| 7,164,885 B2 * | 1/2007 | Jonsson et al. ............... 455/41.2 |
| 7,720,021 B1 * | 5/2010 | Zhou et al. ..................... 370/315 |
| 7,974,574 B2 | 7/2011 | Shen et al. |

(Continued)

FOREIGN PATENT DOCUMENTS

| | | |
|---|---|---|
| CN | 101051981 A | 10/2007 |
| CN | 101119263 A | 2/2008 |

(Continued)

OTHER PUBLICATIONS

A Multi-Protocol Approach to Service Discovery and Access in Pervasive Environments; http://www-c.inria.fr/plastic/test-1/raverdy_mobiquitous.pdf.

(Continued)

*Primary Examiner* — John Blanton
(74) *Attorney, Agent, or Firm* — Andrew Sanders; Micky Minhas

(57) ABSTRACT

The normal roles of wireless stations and wireless access points in initiating the establishment of wireless connections may be reversed without the need for changes in the network interfaces for either the station or access point device. This capability may be used to allow wireless devices acting as access points, but on which service clients operate, to initiate the establishment of a connection with a station, on which a wireless service provider operates. Discovery of services between wireless devices can be provided prior to establishing a connection between the devices. A service client device providing access point functionality may broadcast an invitation for service advertisements and then receive service advertisements from relevant service providers acting as wireless stations. An information element may be included as part of periodically broadcast administrative messages to wirelessly convey an invitation for service advertisements. In response to a service advertisement, the access point may send to the wireless station an invitation to connect, prompting the wireless station to begin to establish a connection according to a wireless communication protocol.

21 Claims, 9 Drawing Sheets

(56) References Cited

U.S. PATENT DOCUMENTS

| | | | |
|---|---|---|---|
| 8,126,145 B1* | 2/2012 | Tewari et al. | 380/255 |
| 2001/0010689 A1 | 8/2001 | Awater et al. | |
| 2001/0041568 A1 | 11/2001 | Hughes et al. | |
| 2002/0120750 A1* | 8/2002 | Nidd | 709/227 |
| 2003/0002456 A1* | 1/2003 | Soomro et al. | 370/328 |
| 2003/0043771 A1 | 3/2003 | Mizutani et al. | |
| 2003/0065851 A1 | 4/2003 | Layman | |
| 2003/0228842 A1 | 12/2003 | Heinonen et al. | |
| 2004/0009769 A1 | 1/2004 | Yokoyama | |
| 2004/0077336 A1 | 4/2004 | Lauriol | |
| 2004/0087274 A1 | 5/2004 | Ekberg et al. | |
| 2004/0106408 A1 | 6/2004 | Beasley et al. | |
| 2004/0170134 A1 | 9/2004 | Furuyama et al. | |
| 2005/0021725 A1 | 1/2005 | Lobbert | |
| 2005/0058109 A1 | 3/2005 | Ekberg | |
| 2005/0073522 A1 | 4/2005 | Aholainen et al. | |
| 2005/0078644 A1 | 4/2005 | Tsai, Jr. et al. | |
| 2005/0128958 A1 | 6/2005 | Hamdan | |
| 2005/0164678 A1 | 7/2005 | Rezvani et al. | |
| 2005/0185660 A1 | 8/2005 | Ekberg et al. | |
| 2005/0186949 A1 | 8/2005 | Ho | |
| 2005/0193106 A1* | 9/2005 | Desai et al. | 709/223 |
| 2005/0232242 A1 | 10/2005 | Karaguz et al. | |
| 2005/0255839 A1 | 11/2005 | Perttila | |
| 2005/0255844 A1 | 11/2005 | Sugaya et al. | |
| 2005/0282556 A1 | 12/2005 | Morris | |
| 2006/0004456 A1 | 1/2006 | McKay | |
| 2006/0034256 A1 | 2/2006 | Addagatla et al. | |
| 2006/0039336 A1* | 2/2006 | Ishimura | 370/338 |
| 2006/0094456 A1 | 5/2006 | Rittle et al. | |
| 2006/0133414 A1 | 6/2006 | Luoma et al. | |
| 2006/0171388 A1* | 8/2006 | Ikeda | 370/389 |
| 2006/0171403 A1 | 8/2006 | Kim et al. | |
| 2006/0221919 A1 | 10/2006 | McRae et al. | |
| 2006/0239208 A1* | 10/2006 | Roberts et al. | 370/254 |
| 2006/0251104 A1* | 11/2006 | Koga | 370/449 |
| 2006/0253559 A1 | 11/2006 | Espina Perez et al. | |
| 2006/0282514 A1 | 12/2006 | Saint-Hilaire et al. | |
| 2007/0081477 A1 | 4/2007 | Jakkahalli et al. | |
| 2007/0141984 A1 | 6/2007 | Kuehnel | |
| 2007/0141986 A1 | 6/2007 | Kuehnel | |
| 2007/0141988 A1 | 6/2007 | Kuehnel | |
| 2007/0147313 A1 | 6/2007 | Braam et al. | |
| 2007/0147317 A1 | 6/2007 | Smith et al. | |
| 2007/0150570 A1 | 6/2007 | Eastham et al. | |
| 2007/0189249 A1 | 8/2007 | Gurevich et al. | |
| 2007/0248058 A1 | 10/2007 | Fajardo et al. | |
| 2008/0025512 A1* | 1/2008 | Nakajima | 380/270 |
| 2008/0148359 A1* | 6/2008 | Kezys et al. | 726/4 |
| 2009/0216898 A1* | 8/2009 | Meng et al. | 709/232 |
| 2009/0327713 A1* | 12/2009 | Marin et al. | 713/168 |

FOREIGN PATENT DOCUMENTS

| | | |
|---|---|---|
| EP | 1227689 A1 | 7/2002 |
| EP | 1727310 A1 | 11/2006 |
| JP | 2001/298467 A | 10/2001 |
| JP | 2003/258808 A2 | 9/2003 |
| JP | 2005/328231 A | 11/2005 |
| KR | 1999/023310 A | 3/1999 |
| WO | WO 0186486 A3 | 11/2001 |
| WO | WO 2004/086667 A2 | 10/2004 |
| WO | WO 2005/060416 A3 | 7/2005 |
| WO | WO 2007/001968 A2 | 2/2007 |
| WO | WO 2007/019689 A1 | 2/2007 |

OTHER PUBLICATIONS

Adaptive Interaction for Enabling Pervasive Services; http://delivery.acm.org/10.1145/380000/376886/p20-samulowitz.pdf?key1=376886&key2=4070384811&coll=GUIDE&dl=GUIDE&CFID=28883839&CFTOKEN=55961476.

Service Rings—A Semantic Overlay for Service Discovery in Ad hoc Networks; http://citeseer.ist.psu.edu/cache/papers/cs/27184/http:zSzzSzwww.ipd.uka.dezSzDIANEzSzenzSzinhaltezSz..zSz..zSzdocszSzNBIS2003.pdf/klein03service.pdf.

International Search Report from International Application No. PCT/US2006/048924, filed Dec. 20, 2006.

S. Helal, N. Desai, V. Verma, and C. Lee, "Konark—A Service Discovery and Delivery Protocol for Ad-Hoc Networks," 2003, pp. 1-7, University of Florida, Gainesville, Florida. http://media.csee.ltu.se/reading/papers/konark_wcnc2003.pdf.

A. Friday, N. Davies, N. Wallbank, E. Catterall, and S. Pink, "Supporting Service Discovery, Querying and Interaction in Ubiquitous Computing Environments," Wireless Networks, 2004, pp. 631-641, vol. 10, Kluwer Academic Publishers, The Netherlands. http://delivery.acm.org/10.1145/1040000/1035680/p631-friday.pdf?key1=1035680&key2=6630472311&coll=GUIDE&dl=GUIDE&CFID=58960884&CFTOKEN=5973545.

J. Krumm and K. Hinckley, "The NearMe Wireless Proximity Server," UbiComp 2004, The Sixth International Conference on Ubiquitous Computing, pp. 283-300, Sep. 7-10, 2004, Nottingham, England. http://research.microsoft.com/users/kenh/papers/NearMe.pdf.

J. Rekimoto, Y. Ayatsuka, M. Kohno, and H. Oba, "Proximal Interactions: A Direct Manipulation Technique for Wireless Networking," 2003, pp. 1-8, Sony Computer Science Laboratories, Inc., Toyko, Japan. http://www.idemployee.id.tue.nl/g.w.m.rauterberg/conferences/INTERACT2003/INTERACT2003-p511.pdf.

Cisco Systems, The Benefits of Centralization in Wireless LANs via the Cisco Unified Wireless Network, White Paper, Feb. 2006, 13 pgs., http://www.cisco.com/application/pdf/en/us/guest/products/ps6521/c1650/cdccont_0900aecd8040f7b2.pdf.

STMicroelectronics, Dual-band IEEE 802.11a/b/g mobile Wi-Fi solution, Product Description, Feb. 2006, 2 pgs., http://www.st.com/stonline/products/promlit/pdf/fldual0206.pdf.

J. Wojtiuk, Bluetooth and WiFi integration: Solving co-existence challenges, Semiconductor Technology, Oct. 2004, pp. 20-26, http://rfdesign.com/mag/410rfdf1.pdf.

Meier, et al., "Proximity-Based Service Discovery in Mobile Ad Hoc Networks," Distributed Systems Group, Department of Computer Science, Trinity College, Dublin, Ireland, http://www.es.tcd.ie/publications/tech-reports/reports.05/TCD-CS-2005-35.pdf.

Lenders, et al., "Service Discovery in Mobile Ad Hoc Networks: A Field Theoretic Approach," Swiss Federal Institute of Technology (ETH Zürich), Switzerland http://www.tik.ee.ethz.ch/~lenders/publication/lenders_wowmom05.pdf *Partly founded by the Swiss National Science Foundation (SNF) under grant 200021-103578.

Poupyrev, et al., "Service Discovery in TinyObj: Strategies and Approaches," The Graduate School of Frontier Science, Tokyo University, Peter Davis, Adaptive Communications Research Laboratories, ATR, http://www.medien.ifi.lmu.de/permid2005/pdf/PavelPoupyrev_Permid2005.pdf.

Office Action for CN Patent Application No. 200880100271.07 (MS 320008.03), including partial English translation/Summary; dated Nov. 23, 2012; 13 pgs.

Office Action for CN Patent Application No. 200880100271.07 (MS 320008.03), including partial English translation/Summary; dated Jan. 22, 2013; 10 pgs.

Notice of Allowance and Fee(s) Due for U.S. Appl. No. 11/880,970 (now U.S. Patent No. 7,974,574); dated Feb. 4, 2011; 6 pgs.

Non-Final Office Action for U.S. Appl. No. 11/880,970 (now U.S. Patent No. 7,974,574, MS 320008.01); dated Oct. 5, 2010; 9 pgs.

Final Office Action for U.S. Appl. No. 11/880,970 (now U.S. Patent No. 7,974,574, MS 320008.01); dated Jul. 16, 2010; 11 pgs.

Non-Final Office Action for U.S. Appl. No. 11/880,970 (now U.S. Patent No. 7,974,574, MS 320008.01); dated Mar. 17, 2010; 9 pgs.

International Search Report for PCT Application No. PCT/US2008/068880 (MS 320008.02); Applicant: Microsoft Coporation; dated Jan. 16, 2009; 12 pgs.

Office Action for CN Patent Application No. 200880100271.07 (MS 320008.03); dated Apr. 23, 2012; 11 pgs.

Office Action for CN Patent Application No. 200880100271.07 (MS 320008.03), including partial English translation/Summary; dated Jun. 21, 2013; 8 pgs.

Machine translation of CN101119263A; Feb. 6, 2008; 10 pages.
Machine translation of CN101051981A; Oct. 10, 2007; 5 pages.

* cited by examiner

BASE STATION INITIATED PROXIMITY SERVICE DISCOVERY AND CONNECTION ESTABLISHMENT

BACKGROUND

Wireless communication technologies such as 802.11, Ultrawideband (UWB), and Bluetooth enable devices to communicate wirelessly over a relatively short range, e.g., less than 100 meters. Services may be provided by one device to another device using wireless communications once a connection is established between the two devices.

A variety of services may be provided over wireless communications between devices. As one example, a laptop computer may communicate wirelessly with a printer to print documents. Once a wireless connection is established between the computer and the printer, the computer may discover the print services provided by the printer. The computer may then take advantage of printing services offered by the printer via the wireless connection. Other examples of services that may be provided over wireless communications include headset connectivity and PDA connectivity.

Various wireless protocols, for example, Bluetooth, include a service discovery protocol. Wireless Service discovery protocols allow automatic detection of services offered by devices within the wireless proximity.

Many devices communicate using wireless protocols which are not specifically adapted for discovering proximity-based services. For example, many computers use 802.11 in an infrastructure mode to connect to a network through an access point. 802.11 can also be used in ad hoc mode to connect to local devices, but 802.11 does not include a service discovery protocol, which can make discovering a service cumbersome when using 802.11.

Many previously developed IP-based methods of discovering services require a connection to be established with a device before services provided by a device can be discovered. For example, network discovery protocols such as SSDP (Simple Service Discovery Protocol), WS-Discovery (Web Services Discovery), and SLP (Service Location Protocol) require network layer connectivity (Layer 3 of the OSI model) to be established prior to the discovery of services on the network. Once connected, services provided by a device send broadcast or multicast messages over the IP network to advertise their services.

SUMMARY OF INVENTION

To expand the utility and ease of use of wireless devices, the normal roles of stations and access points in initiating the establishment of connections may be reversed without the need for changes in the network interfaces for either the station or access point device. This capability may be used to allow wireless devices acting as access points, but on which service clients operate, to initiate the establishment of a connection with a station, on which a wireless service provider operates. Once the connection is established, the service client then may communicate with the wireless service provider to obtain the service.

For example, such a capability could be used in conjunction with wireless devices having an 802.11 network interface. The 802.11 protocol is widely supported by laptop computers and other portable computing devices, and frequently those devices operate as access points in that protocol. Nonetheless, clients for services often operate on those devices, with the services being resident on devices that are configured as stations.

An access point seeking a service may identify stations with which to initiate the establishment of a connection by sending messages that invite those stations to disclose service information. The access point may use administrative messages to exchange information to identify a station that provides a certain service or to invite the station to establish a connection. If the administrative messages are of the type that are exchanged before a connection is established, a device acting as an access point can identify available services before a connection is established.

By having devices that act as service clients, rather than service providers, implement access point functionality, service provider devices may be relieved of the burden often imposed on their processing and memory resources when implementing access point functionality. Additionally, devices that provide services can have a less complex network interface because they can operate only as a wireless station and are not required to implement access point functionality.

Reversing the normal roles of wireless stations and access points in initiating the establishment of connections may enable power saving on wireless service provider devices, in some embodiments, because such devices would operate as wireless stations instead of as access points, and power save behavior is typically defined for wireless stations.

Additionally, in some embodiments, a service client, acting as an access point, may concurrently maintain connections with multiple service providers.

The advantages and benefits described herein are not necessarily intended to be limiting, and some or all of the advantages and benefits do not necessarily need to achieved or implemented for various embodiments to fall within the scope of the invention.

To discover a service (or services), a first device may send a message inviting local devices to advertise their service (or services) if they offer a potentially suitable service. In response, a second device or other device acting on behalf of the local device may send a wireless service advertisement to the computer indicating the type(s) of service(s) that are available. In accordance with one aspect of the invention, first device may operate as an access point according to a wireless protocol and the invitation to advertise and/or the service advertisement may be a wireless message that includes an information element (IE) in an administrative message that would otherwise be transmitted in accordance with the wireless protocol. For example, an IE may be included in a periodically broadcast beacon packet or a probe response. In the case of the invitation to advertise, the IE may include information about the service(s) which are desired and/or other suitable information. In the case of the service advertisement, the IE may include information about the types of services offered by the device and/or any other suitable information.

Once a device receives a service advertisement IE, the device may present information about available services to a user of that device, even before a connection to another device providing those services is established. As a result, the user may select one or more of the available service(s) and a connection may be established so that the user may access the services. Establishment of such a connection may be initiated by the user's device, even if configured as an access point.

One embodiment of the invention relates to a method of wirelessly receiving, by a first device, service information regarding at least one service provided by a second device that is in the proximity of the first device. The method includes sending, from a first device, a wireless message that includes an invitation to provide a wireless advertisement message regarding service information. The method also includes receiving, from a second device, a wireless advertisement message that includes service information related to at least one service provided by the second device.

Another embodiment of the invention relates to a method of wirelessly advertising services to a first device by a second device, the first device being in the proximity of the second device. The method includes receiving, from a first device, a wireless message that includes an invitation to provide a wireless advertisement message. The method further includes, in response to the wireless message, sending, to the first device, a wireless advertisement message that includes information related to at least one service provided by a second device.

A further embodiment of the invention relates to at least one computer-readable medium having computer-readable instructions for performing steps of a method of instructing a network device to send a wireless message to wireless devices in the proximity of the network device. The method includes receiving, from a service client, desired service information, and constructing at least one information element as an invitation to advertise services, the at least one information element corresponding to the desired service information. The method further includes providing the at least one information element to a network device in conjunction with a command to the network device to broadcast the at least one information element within a wireless message.

Another embodiment of the invention relates to a method of accessing a service over a wireless network by a wireless service client operating on a first device, the service operating on a second device, the network operating in accordance with a protocol, the first device providing wireless access point functionality in accordance with the protocol, and the second device providing station functionality in accordance with the protocol. The method includes sending, from the first device to the second device, a first wireless message that includes an invitation to establish a connection. The method further includes receiving, from the second device in response to the first wireless message, a second wireless message that includes a connection request in accordance with the protocol.

A further embodiment of the invention relates to a method of providing a service over a wireless network to a wireless service client operating on a first device, the service operating on a second device, the network operating in accordance with a protocol, the first device providing wireless access point functionality in accordance with the protocol, and the second device providing station functionality in accordance with the protocol. The method includes receiving, from the first device, a first wireless message that includes an invitation to establish a connection. The method further includes, in response to the first wireless message, sending to the first device a second wireless message that requests a connection between the first device and the second device over the wireless network in accordance with the protocol.

Another embodiment of the invention relates to at least one computer-readable medium having computer-readable instructions for performing steps of a method of instructing a network device to send a wireless message to wireless devices in the proximity of the network device, the network device providing access point functionality. The method includes receiving, from a service client contained within a wireless module that provides access point functionality, information regarding a desired service, and constructing at least one information element, the at least one information element corresponding to the desired service information and an invitation to establish a connection. The method further includes providing the at least one information element to a network device in conjunction with a command to the network device to send the at least one information element within a wireless message.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that user experiences with widely used wireless protocols may be improved by reversing the normal roles of stations and access points in initiating the establishment of connections. This role reversal may permit an access point, on which a service client is operating, to initiate the establishment of a connection between the access point and a wireless station on which a service provider is operating. Once the connection is established between the access point and the wireless station, the service client then may communicate with the wireless station to obtain the service.

For example, such a role reversal could be used in conjunction with wireless devices that use an 802.11 network interface. The 802.11 protocol is widely supported by laptop computers and other portable computing devices, and frequently those devices operate as access points in that protocol. Nonetheless, clients for services often operate on those devices, with the service providers being resident on devices that are configured as wireless stations.

In accordance with aspects of the invention, a service client device may act as an access point (wireless base station) instead of as a wireless station. To facilitate such an arrangement, the access point may broadcast invitations for service advertisements to stations that act as service providers as part of already existing administrative messages, such as periodic beacon transmissions.

In accordance with aspects of the invention, information about the services desired by a service client may be provided by sending a wireless message that includes an information element (IE). An IE may be a block of data suitable for providing information related to service discovery. An IE may include one or more portions of information, as will be discussed in further detail below. In some circumstances, one or more portions of the IE may be compressed prior to the transmission. Embodiments of the invention may be used with any suitable wireless technology, such as IEEE standard 802.11, UWB, Worldwide Interoperability for Microwave Access (WiMax), and cellular protocols, e.g., general packet radio service (GPRS).

In some embodiments disclosed herein, service discovery may be achieved before establishing a connection between devices. Discovering a service provided by a device prior to connecting with the device may allow a user to more convenient access desired services.

Figure 1:
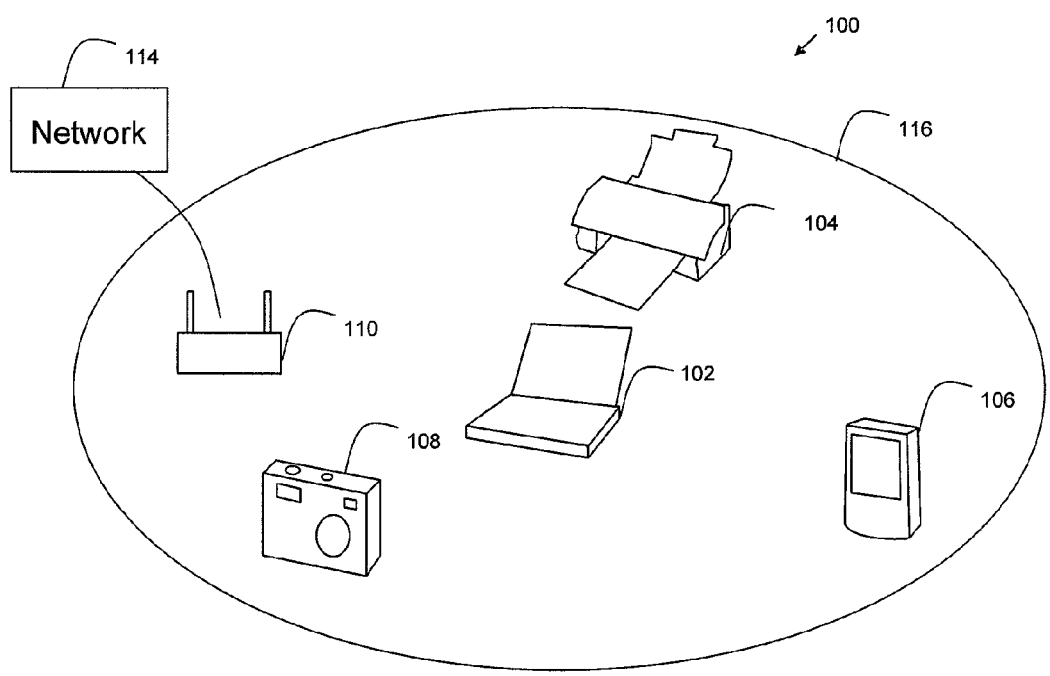
FIG. 1 is diagram illustrating an example of a network environment in which services may be discovered according to some embodiments of the invention.

FIG. 1 is a diagram illustrating an example of a network environment 100 in which devices may communicate regarding service discovery and connection establishment according to some embodiments of the invention. FIG. 1 illustrates an example of a wireless-enabled device 102, e.g., a laptop computer, and examples of other devices with which device 102 may communicate wirelessly, including: a printer 104, a personal digital assistant (PDA) 106, a camera 108 and an access point 110. FIG. 1 also illustrates an example of a wired network 114 that is communicatively coupled to access point 110. Devices in the network environment 100 may communicate wirelessly using any suitable wireless standard, such as 802.11 or Ultrawideband (UWB).

Wireless-enabled device 102 may be a laptop computer or any other device configured to send and receive wireless communications, such as a PDA, a cell phone, or any other suitable device. Wireless-enabled device 102 may be configured to interface with a human user, i.e., using a screen, keyboard, touchpad and/or any other suitable interface.

A user of wireless-enabled device 102 may desire a particular service. For example, the user may wish to establish a wireless connection between wireless-enabled device 102 and printer 104 for printing documents. The user may command wireless-enabled device 102 to invite wireless messages (such as service advertisements that advertise available services) from other devices.

Figure 2:
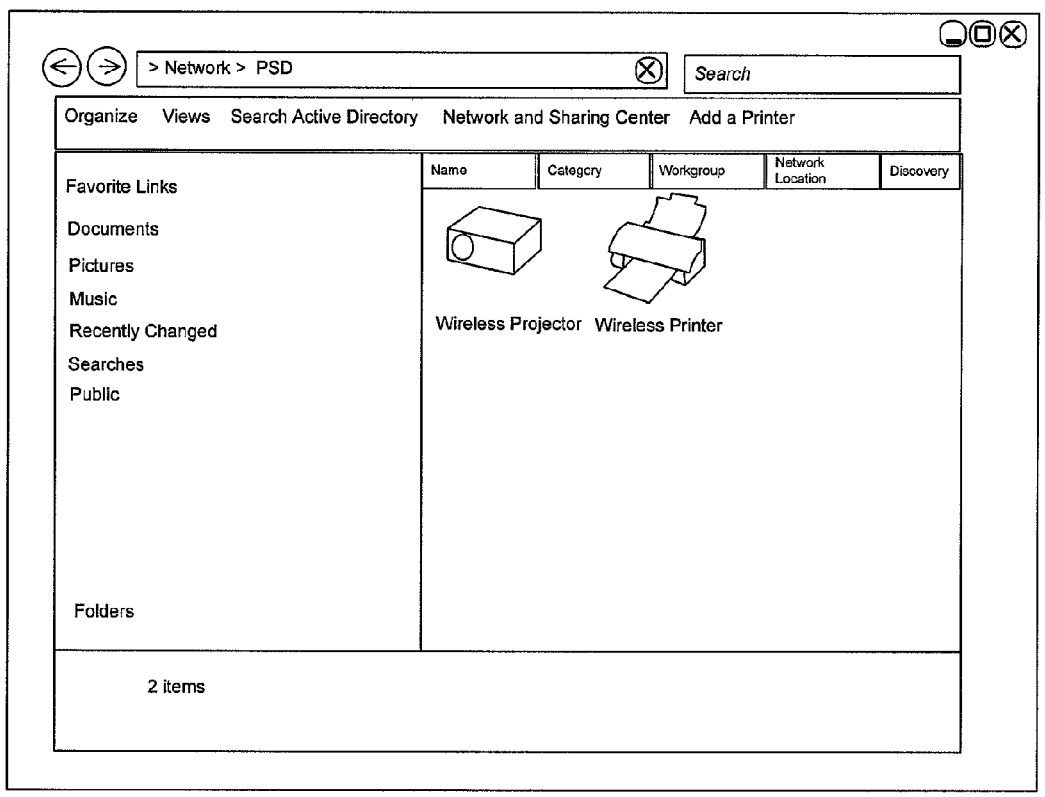
FIG. 2 illustrates an example of a graphical user interface window that displays information about services that may be accessed wirelessly.

When wireless-enabled device 102 receives service advertisements, an option to connect to the advertised services may be presented to the user, for example with a graphical user interface 200 as shown in FIG. 2. In the embodiment of FIG. 2, the user may have instructed wireless-enabled device 102 to invite service advertisements from any wireless printers and wireless projectors available in the proximity of wireless-enabled device 102. One available wireless printer and one available wireless projector may be available in the proximity, and icons 202 and 204 may be presented to the user, optionally along with further information about the service(s) available. In some embodiments, the user may select a service by clicking on the relevant icon.

In some embodiments, wireless-enabled device 102 may send an invitation to advertise services, and the invitation may not specify types of services, but instead may invite advertisements for all services available in the proximity. In this manner, available services may be presented to the wireless-enabled device 102 and the user.

Figure 3:
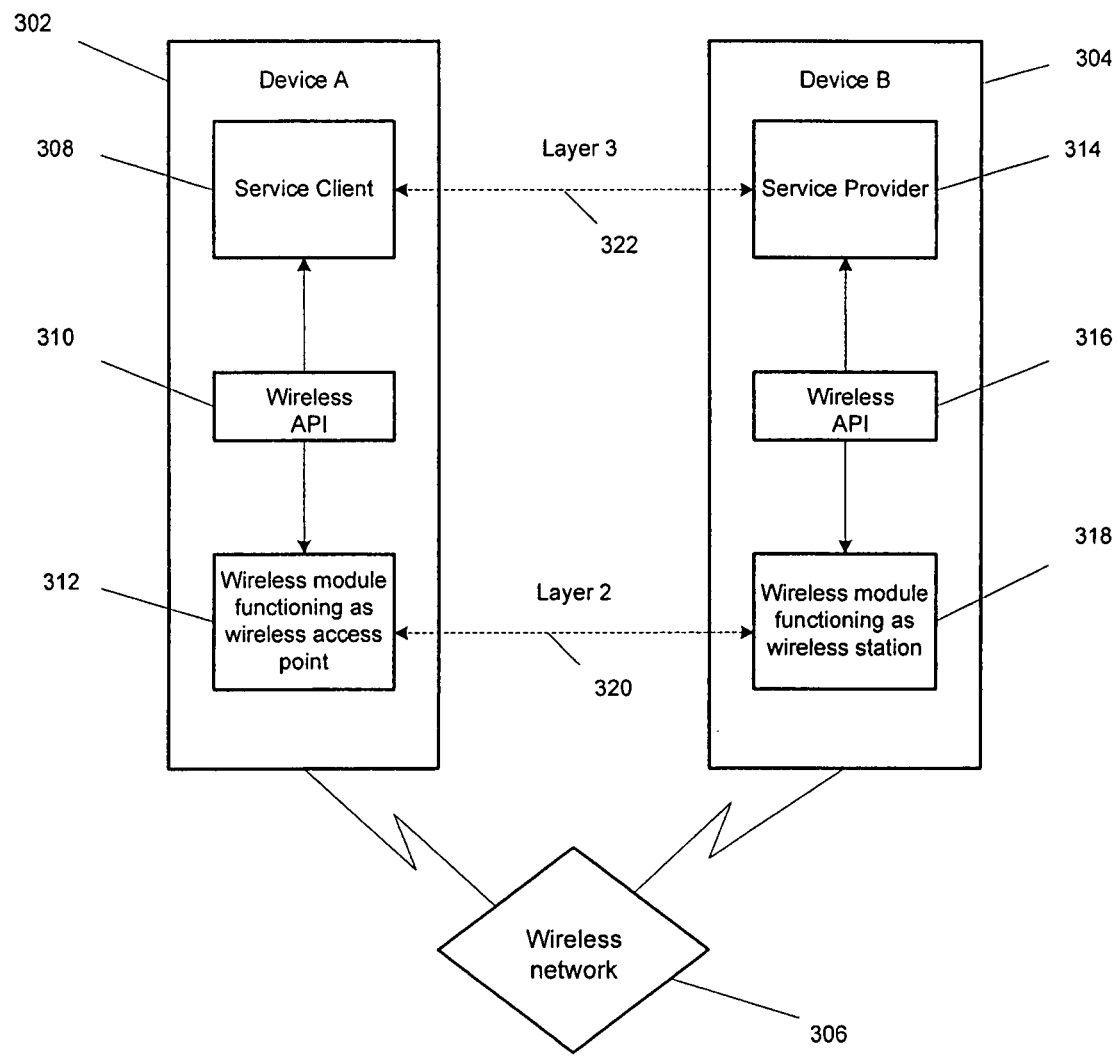
FIG. 3 is a diagram illustrating an example of a computing environment in which one device may wirelessly discover and access a service from another device.

One example of a computing environment 300 in which methods disclosed herein may be used is illustrated in FIG. 3. Wireless-enabled device 302 includes a service client 308, a wireless API 310 and a wireless module 312 which functions as a wireless access point. These companies may be implemented in any suitable way. For example, service client 308 and wireless API 310 may be implemented as software modules. Wireless module 312 may be implemented as a physical network interface card in combination with a driver or other software. Via a wireless network 306, device 302 may send and/or receive messages with another wireless-enabled device 304, and/or be wirelessly connected to device 304. Wireless-enabled device 304 includes a service provider 314, a wireless API 316, and a wireless module 318 which functions as a wireless station. These components, like the components of device 302, may also be implemented in any suitable way.

By having service client device 302 provide access point functionality, service provider device 304 may be freed from certain memory and processing requirements. However, for service client 308 to access a service from service provider 314, a layer 3 connection 322 must be established between service client 302 and service provider 314. Such a connection, in turn, requires layer 2 connection 320 be established.

However, many prior wireless protocols do not provide a mechanism for a wireless module, acting as an access point, to initiate a connection with another device acting as a station. Thus, wireless devices operating according to those protocols may not provide an easy and user friendly mechanism to access a service provided by service provider 314 through service client 308.

Figure 4:
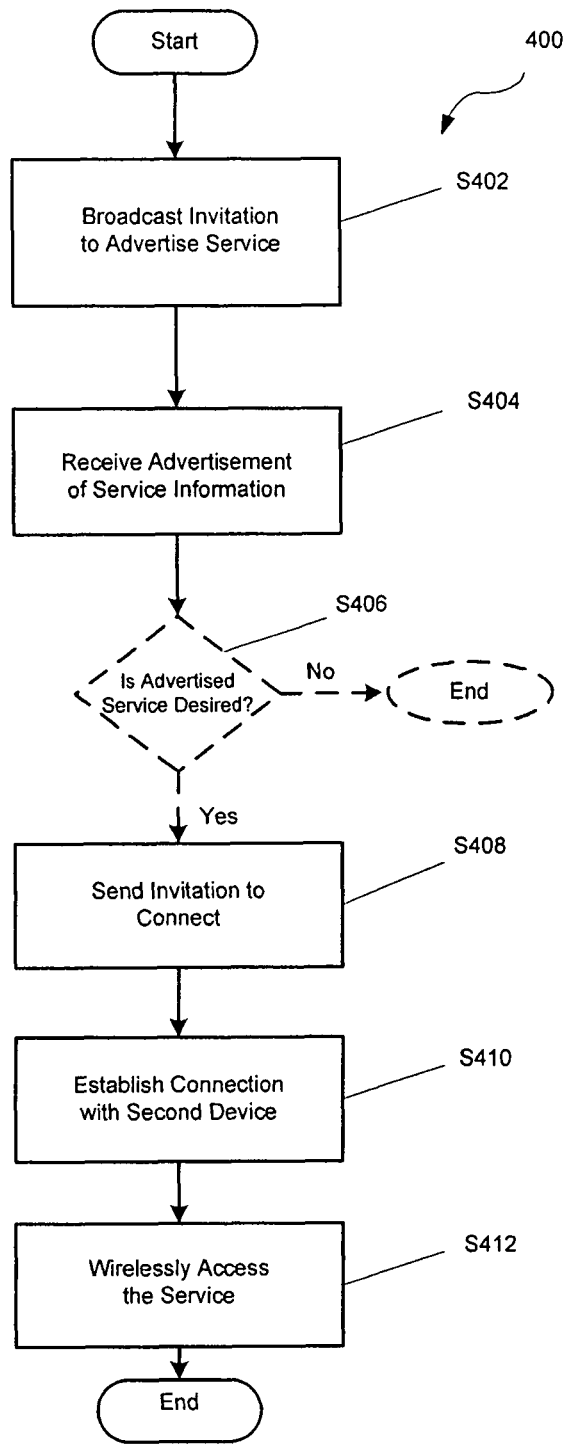
FIG. 4 is a flowchart illustrating an example of a method of wirelessly accessing a service.

FIG. 4 illustrates an example of a simple and user friendly method 400 of accessing a service that may be from a device 102 in the network environment shown in FIG. 1. In step S402, wireless-enabled device 102 may send a wireless message which includes an invitation to advertise services, the invitation serving to notify other wireless-enabled devices in proximity to wireless-enabled device 102 to send service advertisements. The invitation message may include information that represents the type of service sought by wireless-enabled device 102. For example, the wireless message may include information, which, when received by a service provider, indicates that a printing service has been requested. In some embodiments, the wireless message includes one or more IEs including service information regarding services that are desired. The service information within the IE may indicate a particular service, e.g., a printing service. In other embodiments, the invitation to advertise message may request multiple services, and in still further embodiments, the invitation to advertise message may not specify particular services but instead may invite service advertisement messages for all available services. For example, an IE may contain a wildcard value or be left blank to indicate desirability of multiple or all services within the proximity.

In one aspect of the invention, the invitation message may be included in an 802.11 beacon or probe response message. The invitation to advertise message may be sent repeatedly until wireless-enabled device 102 receives an invitation on response. For example, the invitation to advertise message may be broadcast periodically as part of regularly broadcast administrative messages.

As illustrated in FIG. 1, devices that receive the invitation to advertise message may be present in the proximity 116 of wireless-enabled device 102. The proximity 116 of wireless-enabled device 102 may be defined by the radio range of wireless-enabled device 102 and/or a range of devices receiving the invitation to advertise message. As one example, the proximity 116 of wireless-enabled device 102 may include the space within approximately 100 meters of wireless-enabled device 102. The radio range may be greater than or less than 100 meters depending on various factors including the technology used, the strength of the transmitter, the amount of noise present on the channel, the physical environment in which wireless-enabled device 102 operates, etc. However, the proximity 116 of wireless enabled device 102 need not necessarily be defined by the radio range, but may be determined based on other factors, as is discussed in further detail below. Regardless of how proximity is determined, a device in the proximity 116 of wireless-enabled device 102 may receive the invitation to advertise message.

In step S404, wireless-enabled device 102 may receive service information from another device in the network in the form of a service advertisement. This service information may include information regarding details of the service provided, such as whether a print service offered by the printer 104 includes a color printing option. In some embodiments, wireless-enabled device 102 may receive a service advertisement including an IE, which will be discussed in further detail below.

In step S406, the device 102 may determine whether the available service is desired. If a determination is made that the service is desired, in step S408, device 102 may prompt the other device to start the establishment of a connection by sending an invitation to establish a connection. For example, wireless-enabled device 102 may indicate to a user that the desired service, e.g., a print service, is available. This indication may be made in any suitable way, e.g., by displaying a visual image that represents to the user the availability of the print service (for example, see the graphical user interface illustrated in FIG. 2). If desired, the user may then send an invitation to establish an connection between wireless-enabled device 102 and printer 104 by using an appropriate command. However, the sending of the invitation need not necessarily be initiated by the user.

As an alternative, wireless-enabled device 102 may be programmed to automatically send an invitation to establish a connection based on one or more criteria. For example, wireless-enabled device 102 may be programmed to automatically initiate connection to certain desirable "preferred" services once they are in range. As another example, a wireless-enabled device may be programmed to initiate connection to the closest device that provides a particular service, e.g., the closest printer. For example, a user may command the device 102 to print a document, whereupon the device 102 may initiate method 400, resulting in the establishment of a connection with the printer 104 and printing of the document. As another example, information in the IE of the service advertisement may be compared with a block/deny list to determine whether wireless-enabled device 102 should communicate further with the device. Based on the IE, the wireless-enabled device 102 may determine whether the device provides the desired service, for example, by comparing the received information about the service provided with the type of service that was specified in the message including an invitation to advertise services. This determination may be made in any suitable way. For example, fields of the received IE may be compared with fields of the IE sent in the invitation. Any suitable matching criteria may be used to determine whether the discovered service is appropriate.

In some circumstances, a device such as printer 104 may require authentication for a connection to be established. If authentication is required, the user of wireless-enabled device may be prompted to enter a password, pin or other identification number such as an identification number derived from biometric information, e.g., a fingerprint, or retinal scan. Authentication may be provided using any suitable security protocol, such as IPsec. Authentication alternately may be based on payment or billing information, e.g., so that services are only provided once a payment agreement has been reached. If the authentication is successful, a connection then may be established.

To establish a connection with printer 104 or other device, wireless-enabled device 102 may act as an access point according to the wireless protocol. Connection establishment may include layer 2 connection and authentication procedures, and potentially higher layer handshakes.

Once a connection has been established between a wireless-enabled device and a device that provides a service, the devices may communicate further with respect to accessing the requested service in a step S412. For example, wireless-enabled device 102 may communicate wirelessly with printer 104 to print documents. The service that is accessed may be accessed in any suitable known manner or in any suitable manner developed hereafter.

As applied to 802.11, UWB or any other suitable wireless standard, the phrase "establishing a connection" means that a first device (e.g., a wireless station) sends a connection request to a second device (e.g., an access point) and the second device responds to agree on the connection parameters and accept the connection. For purposes herein, the phrase "establishing a connection with a first device" means the step(s) performed by the device establishing the connection with the first device and does not include the steps performed by the first device as part of the establishment of the connection. For purposes herein, the phrase "establishing a connection between a first and a second device" means the steps performed by each of the first and second devices in establishing the connection. The connection that is established may be suitable for providing a service.

In an 802.11 context, service discovery messages may be sent and received via layer 2 802.11 beacon and probe messages or other administrative messages. However, in some embodiments, layer 2 messages may not provide the capability for wirelessly providing a large amount of information describing the service, e.g., a print service. Services may be advertised using layer 3 or higher layer messages, in which a connection has been established that is suitable for providing the service. In an IEEE 802.11 context, once a device acting as a wireless station receives a probe response that includes an invitation to establish a connection, the wireless station may send an association request to the access point. The association request may contain information about the parameters of the connection that is to be established. Once the access point receives the association request, it may respond with an association response message that indicates agreement on the connection parameters and acceptance of the connection. The connection may be considered as established once the wireless station receives the association response message. It should be appreciated that any suitable wireless technologies may be used, and any communication scheme, timing pattern, frequency pattern or other communication means may be established that is suitable for providing a service.

Figure 5:
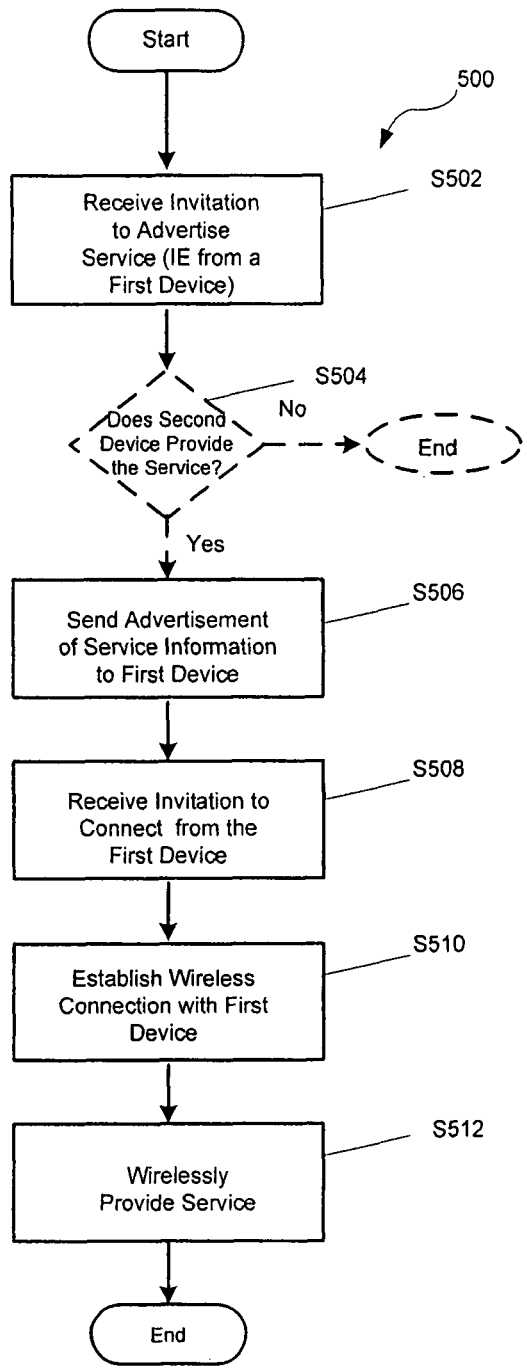
FIG. 5 is a flowchart illustrating an example of a method of wirelessly providing a service.

FIG. 5 illustrates an example of a method 500 of providing information related to a service that may be performed by a device that provides a particular service, e.g., printer 104, and may respond to an invitation or other request message sent from device 102.

In a step S502, an invitation to advertise services for a particular service may be received, e.g., from device 102. The invitation may include an information element. The invitation may be received by printer 104, PDA 106, camera 108 and access point 110 because they are in the radio range of wireless-enabled device 102. Once the invitation is received by printer 104, the information element may be reviewed to determine the service requested.

In a step S504, a device that received the invitation to advertise services may determine whether it provides the requested service. For example, once printer 104 determines the service that is desired by device 102, printer 104 may compare the type of service requested with the type of services that printer 104 provides. This comparison may be made in any suitable way. For example, fields in a received invitation may be compared to fields of a data structure that represents a type of service provided by the device. In cases where the service client device does not invite advertisements for specific services, but instead invites service advertisements for all available services, step S504 may not be performed.

In response to determining that it provides the requested service, printer 104 may respond by sending a response message, e.g., a service advertisement radio message that includes an IE, to wireless-enabled device 102 in a step S506. PDA 106, camera 108 and access point 110 also may receive the message including an invitation to advertise services, but may not respond to the invitation message because they do not provide the type of service requested. Alternatively, as mentioned above, the invitation to advertise message received in step S502 may be a general request for local devices to provide an indication of services provided, regardless of service type. In this case, PDA 106, camera 108, etc. may respond accordingly.

The service advertisement message may include information about the service(s) provided by the device. For example, the service advertisement message sent by printer 104 may include information about the printing services provided by printer 104. The service advertisement message may include information about whether printer 104 is a color printer, whether it can print on both sides of a page and/or other information. Information about services may be sent as an information element (IE) discussed further below. Thereafter, if device 102 wishes to connect with printer 104, an invitation to connect may be sent by device 102 may be received in a step S508. A connection may be established in a step S510 so that the desired service may be provided to device 102 in a step 512.

Figure 6:
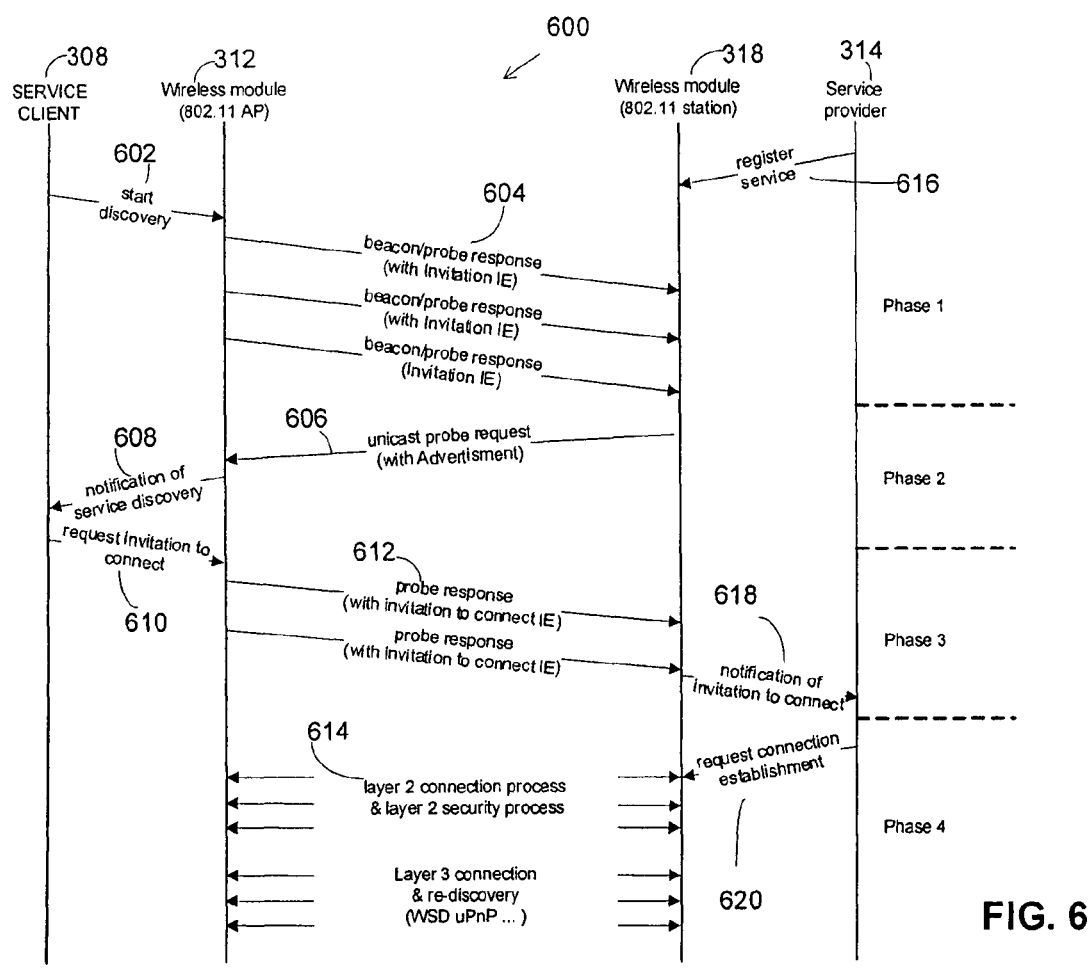
FIG. 6 is a diagram illustrating a sequence of messages that may be transmitted in the computing environment of FIG. 3.

One embodiment of operations performed by a service client and a service provider is described immediately below with reference to FIGS. 3 and 6. This embodiment is not intended to be limiting, and the computing environment of FIG. 3 may be used to implement other operation sequences.

In the described embodiment, the 802.11 wireless protocol is used, and the service client is included in a wireless device that provides 802.11 access point functionality (wireless device 302 of FIG. 3), such as a laptop computer. Although, in some embodiments, other types of wireless protocols may be used, and other types of access point functionality may be provided by the service client device. In still further embodiments, the service client device may provide wireless station functionality instead of access point functionality. Wireless device 302 acts as a typical access point by broadcasting beacon packets to advertise its network, accepting association requests from 802.11 stations, and performing various connection and security functions.

Immediately below, one example of an operation sequence performed by the service client device 302 is described, followed by a description of one example of an operation sequence performed by the service provider device 304.

In a first operation, service client device 302 starts proximity service discovery. Service client 308 issues an API call request 602 to wireless module 312 to start Phase 1 of the discovery process. The API provided by the wireless module may include parameters for a discovery period and for service information regarding services to be invited. The discovery period represents the length of time for the wireless module to carry out the discovery process for the specified service types. In some cases, a value of zero (or other suitable value) may be provided to indicate that service discovery should continue indefinitely for the specified service type(s). The service information may include a list of specific service types to be invited. In some cases, the service information may include an empty list or a value representing a wild card, either of which means that all service types should be invited.

Wireless module 312 may include a discovery service type list, which includes a list of elements, each of which contains information regarding a service type to be discovered, and an expiration time for the service type.

When service client 308 issues an API call request, wireless module 312 may honor the call by performing the following three steps: (1) updating the discovery service type list; (2) constructing one or more information elements to act as invitations to advertise services, the invitations being based on the updated discovery service type list; and (3) issuing a request to the access point to insert the update information elements into its beacon and/or probe response packets 604.

To perform step (1), the following sequence may be performed. If the discovery service type list is empty, the unique service types and expiration times are entered into the discovery service type list. If the discovery service type list is not empty, for each desired service type, the discovery service type list is searched. If the service type already exists in the discovery service type list, then the expiration time is updated. If the service type does not already exist, the service type and its expiration time is added to the list. In step (2), one or more invitation information elements are constructed, and each information element may contain one or more service types. As part of step (3), the access point in the wireless module may remove any expired invitation to advertise information elements from its beacon and/or probe response packets as appropriate, and insert the newly constructed invitation information elements into the beacon and/or probe response packets. Multiple beacon and/or probe response packets may be sent before a service advertisement is received from a service provider device. The broadcasting of the beacon and/or probe response packets is part of Phase 1 of the discovery process.

In a second operation, as part of Phase 2, wireless module 312 listens to incoming unicast 802.11 probe request packets 606 sent from other wireless nodes, and upon receipt of such probe request packets, wireless module 312 searches for service advertisement information elements containing service specific information. If service advertisement information elements are found with new or updated service information, wireless module 312 saves the information into a discovered service list which is maintained internally. Wireless module 312 also sends a notification of service discovery 608 to service client 308 with updates of discovered service providers and service information.

In a third operation, to start Phase 3, upon receiving a notification of a new or updated service, service client 308 may issue an API call 610 to request initiation of a wireless connection with the device that provides the service, for example, wireless device 304. The call may include a Mac address or other identification of the wireless station to be triggered to establish the wireless connection. Optionally, the call may include a list of service types that the service client wishes to enable by establishing the wireless connection. In response to the call, wireless module 308 constructs an invitation to connect information element to be carried in a unicast 802.11 probe response packet 612. The invitation to connect probe response packet contains the destination address, e.g., a wireless station's Mac address, the access point's BSSID, and a connection invitation information element. Wireless module 312 sends the invitation packet periodically until one of three events occurs: (1) an 802.11 connection request is received from the station to which the invitation is sent; (2) a pre-defined time out value is reached; or (3) service client 308 issues a cancellation request by making an API call to wireless module 312.

In a fourth operation, wireless module 312 acts as an 802.11 access point and follows the IEEE 802.11 standard to complete a connection process 614 with the wireless station (for example, device 304). The connection process may include layer 2 connection and authentication procedures, as well as other higher layer handshakes.

Turning to operations performed by service provider device (device 304 in FIG. 3), an 802.11 wireless device, such as laptop and media devices with wireless capability, hosts one or more proximity services. Device 304 acts as a wireless station by performing regular passive and active scan operations, issuing association requests, and performing connection and security functions of an 802.11 station.

In a first operation, in response to an API call 616 issued from service provider 314 to register a service, wireless module 318 updates the service registration list. For each service type received by the wireless module, if the service type does not exist in the service registration list, a new entry containing the service type and service information is added. If the service type does exists in the service registration list, the existing entry is updated with the new service information. An API call also may be available (not shown in Figures) to deregister services.

In a second operation, wireless module 318 in 802.11 station mode performs the regular scan operations to collect the beacon and probe response packets 604 from other wireless nodes in the proximity. Wireless module 318 may operate in a power saving mode when not actively collecting beacon or probe response packets such that wireless module 318 only listens for or collects beacons at periodic or intermittent intervals. Accordingly, the nature of the scan is not a limitation on the invention.

For each received beacon and probe response packet, wireless module 318 searches the packet for information elements containing invitations to advertise services. For each such information element that is found, wireless module 318 collects service information and, for any specified services, checks whether the specified service(s) exist in the service registration list. If one or more services in the service registration list match invited services, a service advertisement information element is constructed. A unicast probe request packet 606 is then constructed to include the service advertisement information element, a destination address (e.g., the Mac address for wireless module 312), a BSSID (e.g., the BSSID for wireless module 312) and other connection specific parameters. The unicast probe request packet 606 is then sent to the access point from which the beacon or probe response packet was received.

If no services in the service registration list match invited services, no probe request is sent in response to the invitation to advertise services.

In a third operation, wireless module 318, in 802.11 station mode, performs regular scan operations to collect the beacon and probe response packets 612 from access points in radio range which may include invitations to establish a connection. For each received unicast probe response packet, wireless module 318 searches the unicast probe response packet for information elements containing invitations to establish a connection. Service information is collected from each of the found information elements, and for each service type collected from an information element containing an invitation to establish a connection, wireless module 318 checks whether the service exists in the service registration list. If a service exists in the service registration list, the wireless module sends a notification of invitation to establish connection 618 to the service provider which is capable of providing the requested service. The notification may include information such as: the requestor's address (e.g., the access point's Mac address); a list of services that the access point is requesting; and connection specific parameters.

When the service provider receives the notification of an invitation to establish a connection, the service provider may decide whether to issue a connection request based on either user input or internal logic. For example, a user controlling the service provider may selectively allow other users to access the service or the service itself may maintain an access control list or other criteria used in automatically determining whether to grant access to the services. A connection may be initiated only if the services will be provided. Once the service provider decides to connect to the access point, Phase 4 starts with the service provider issuing a connection request 620 by calling the wireless connection API to establish a wireless connection with the access point.

In a fourth operation, wireless module 318 acts as an 802.11 station and follows the IEEE 802.11 standard procedures to complete the connection process 614 with the 802.11 access point. This process may include layer 2 connection and authentication processes, and may be followed by higher layer protocol handshakes, such as layer 3 protocol handshakes. Layer 2 communication between device 302 and device 304 is represented with line 320 in FIG. 3 to indicate that information may be communicated between the devices over the wireless connection. A higher layer connection, such as a layer 3 connection 322 may be used to communicate the large amounts of information that may be sent as part of providing a service from device 304 to device 302.

Some or all of the devices included within a wireless network, e.g., devices 302, 304, may use wireless security protocols and algorithms to establish a secure wireless transmission channel. For example, a shared key can be established prior to discovery and may be entered on either service client 308 or service provider 314 during or prior to phase 4.

Figure 7A:
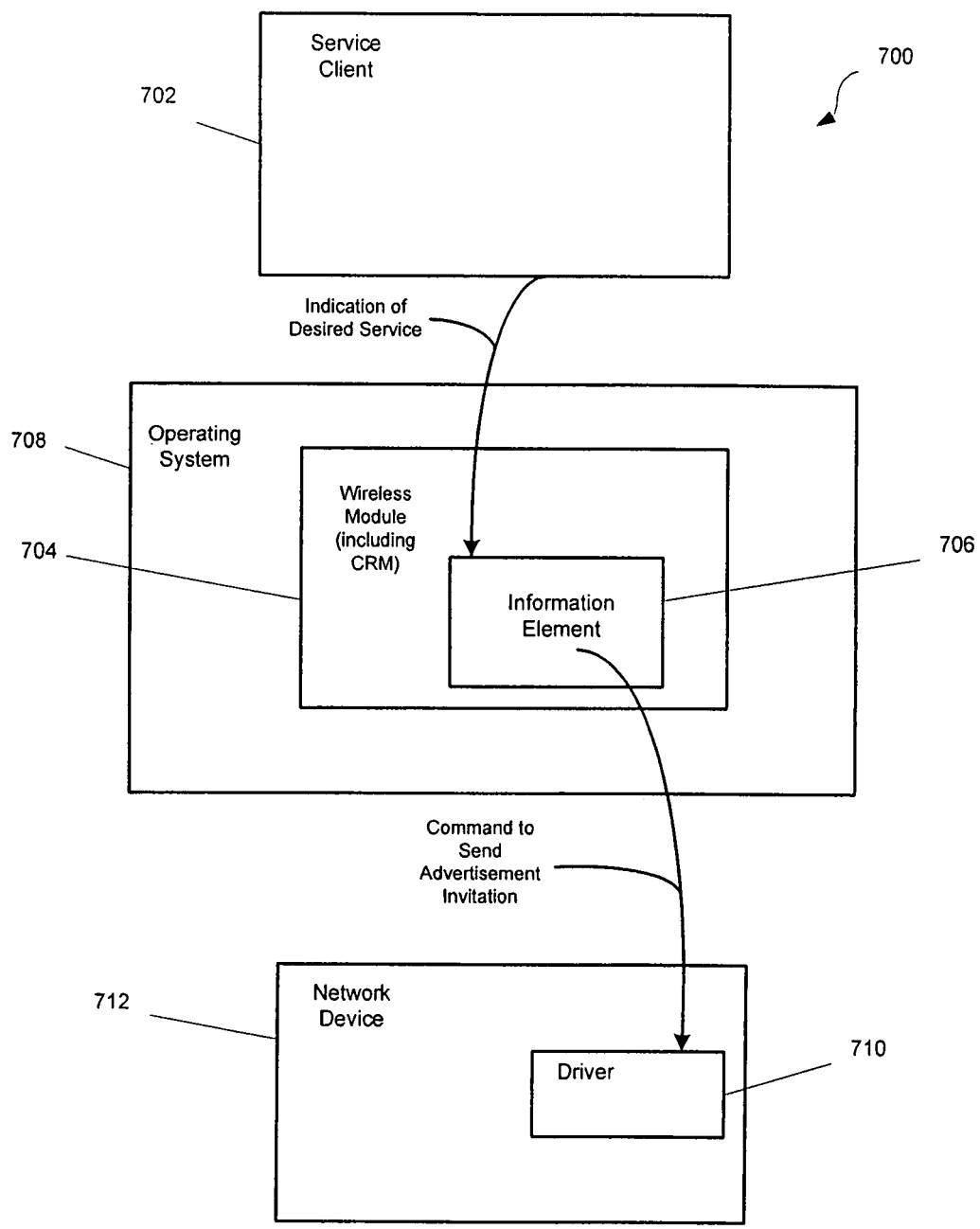
FIG. 7A is a diagram illustrating an example of a device including a service client, a wireless module and a network device.
Figure 7B:
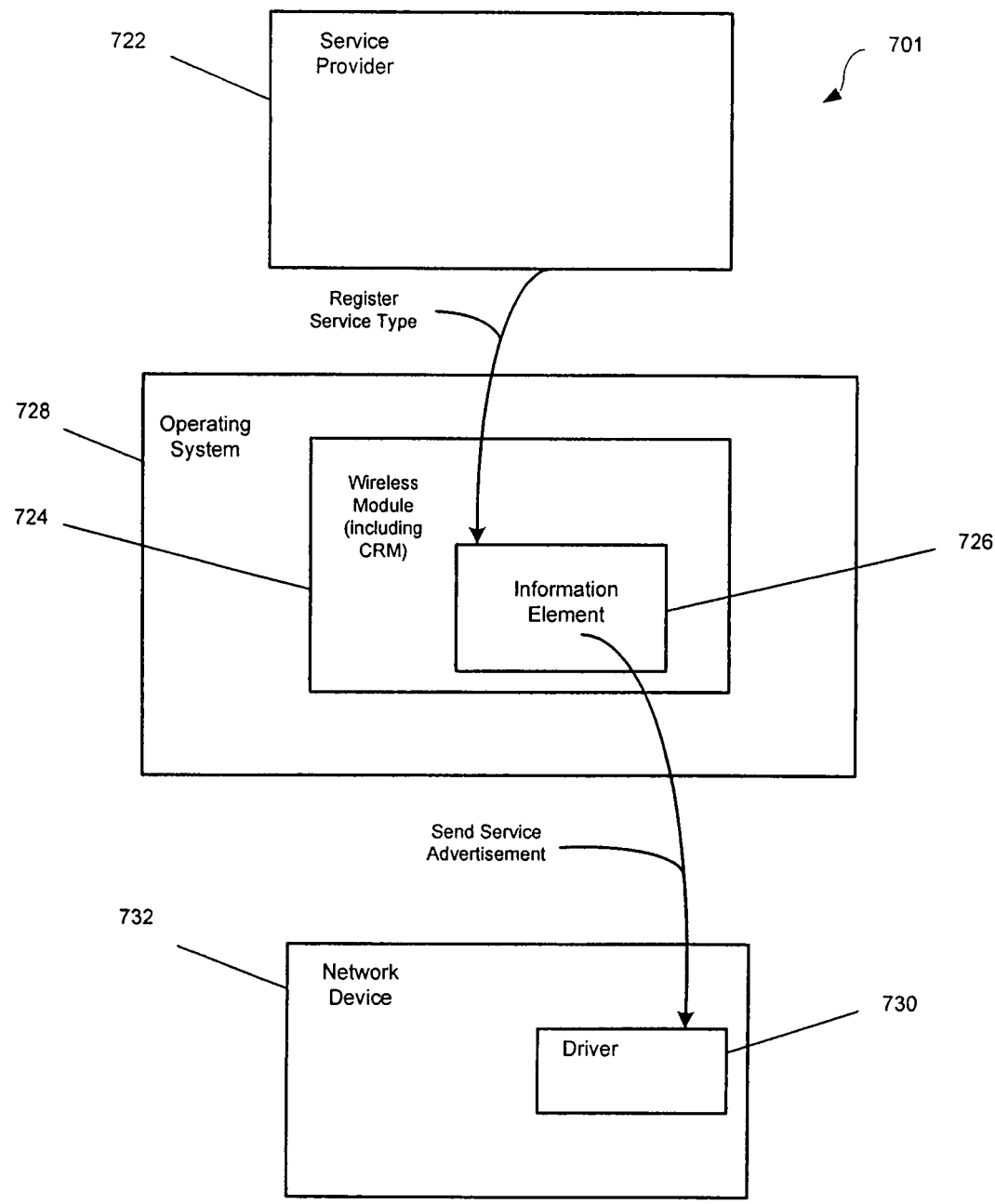
FIG. 7B is a diagram illustrating an example of a device including a service provider, a wireless module and a network device.

FIGS. 7A and 7B illustrate examples of a service client device 700 and a service provider device 701, respectively. As illustrated in FIG. 7A, a service client 702 sends an indication of desired service (or services) to a wireless module 704. Wireless module 704 includes a computer-readable medium (CRM), which may construct an information element 706 based on the desired services information from service client 702. Information element 706 includes information regarding the desired service(s). Wireless module 704, which may operate within an operating system 708, sends the information element to a driver 710 of a network device 712, along with a command to send an invitation for service advertisements, the invitation including information element 706.

A service provider device 701 includes a service provider 722, which registers service type(s) to a wireless module 724. Wireless module 724 includes a computer-readable medium (CRM), which constructs an information element 726 based on the registered service type(s). Wireless module 724, which may operate within an operating system 728, sends information element 706 to a driver 730 of a network device 732, along with a command to send a service advertisement including information element 726.

Figure 8:
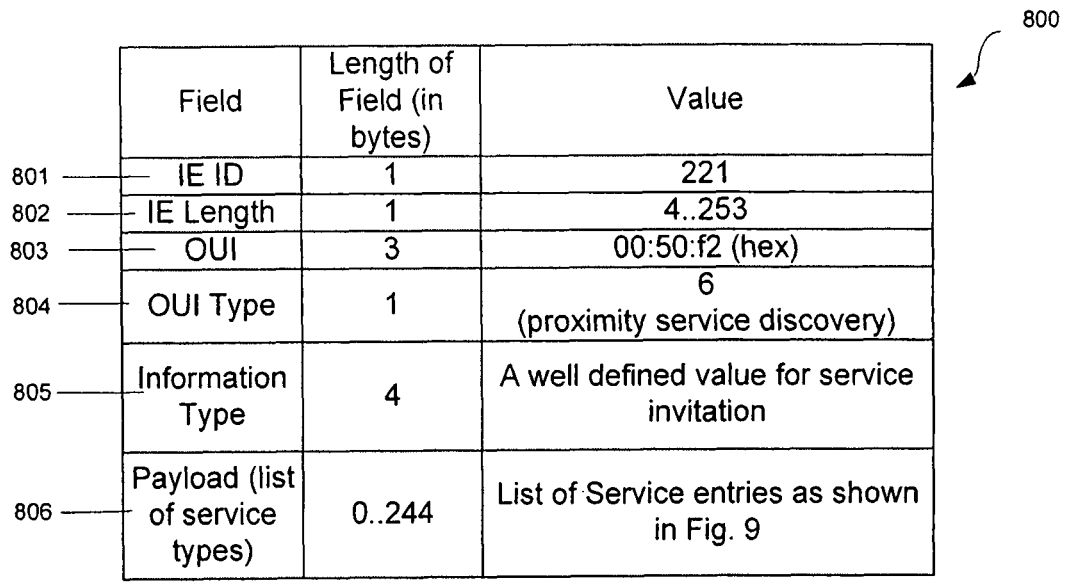
FIG. 8 is a diagram illustrating an example of an information element that may be included as part of an invitation to provide advertisements.

The term of IEs used in embodiments of the invention is not critical. However, aspects of an exemplary IE that may be used for wirelessly conveying service discovery information will now be discussed with reference to FIG. 8, which is a diagram illustrating an example of an IE 800. An IE is a format for sending service-related information recognized by devices that communicate according to one or more wireless standards. For example, the format of the IE may match the capabilities of the underlying standard, e.g. 802.11 or UWB. An IE may be transmitted in TLV (type, length, value) format. In the example illustrated in FIG. 8, IE 800 includes an IE ID 801, an IE Length 802, an OUI 803, an OUI type 804, an information type 805, and a Payload 806. IE ID 801 may be a protocol header that identifies the information as an IE. Payload 806 may include a list of service entries 900 shown in FIG. 9.

Figure 9:
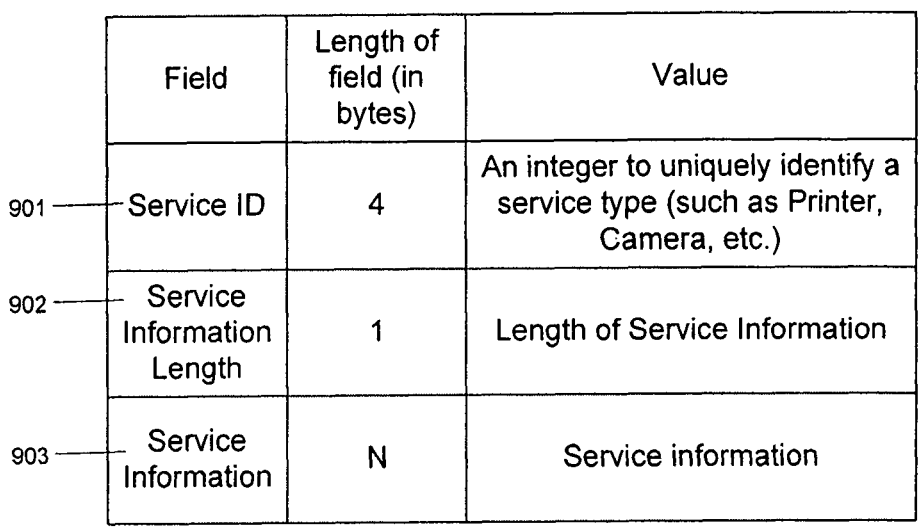
FIG. 9 is a diagram illustrating an example of a service entry element that may be included in the information element illustrated in FIG. 8.

Each service entry 900, as shown in FIG. 9, may include a Service ID 901, a Service Information Length 904, and Service Information 903.

In one aspect of the invention, the proximity 116 of the wireless-enabled device 102 may not necessarily be defined by the radio range of wireless-enabled device 102. As one example, the devices may take advantage of additional mechanisms provided by the wireless protocol, e.g., UWB, for determining the distance between the devices. Thus, the proximity 116 of the wireless-enabled device 102 may be limited to a smaller range than the radio range. Limiting the range at which services can be discovered may provide various benefits. For example, reducing the range may provide increased security by making it more difficult for communications to be intercepted by unintended recipients.

As used herein, the terms "received by a device," and "sent by a device" mean that the messages may be received and/or sent by the device itself or by a device that is in communication with the device. For example, a device 102 may send wireless request messages by communicating by wire with a WLAN access point or other device that may send a wireless request message on behalf of the device 102.

Particular implementation details of computer systems that may execute aspects of the invention will now be described. These implementation details are provided by way of example only, and the invention is not limited to any particular implementation.

Various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

Methods described herein, acts thereof and various embodiments and variations of these methods and acts, individually or in combination, may be defined by computer-readable messages tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Computer-readable messages embodied on one or more computer-readable media may define instructions, for example, as part of one or more programs that, as a result of being executed by a computer, instruct the computer to perform one or more of the functions described herein, and/or various embodiments, variations and combinations thereof. The computer-readable media on which such instructions are embodied may reside on one or more of the components of any of systems described herein, may be distributed across one or more of such components, and may be in transition therebetween. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. For example, various aspects of the invention may be implemented as specialized software executing in a general-purpose computer system, for example, on wireless-enabled device 102 and/or a peripheral device. The computer system may include a processor connected to one or more memory devices, such as a disk drive, memory, or other device for storing data. Memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system also may include one or more input devices, for example, a keyboard, mouse, trackball, microphone, touch screen, or digitizing tablet and one or more output devices, for example, a printing device, display screen, speaker. In addition, the computer system may contain one or more interfaces that connect the computer system to a communication network (in addition or as an alternative to the interconnection mechanism.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Network 114 may be any suitable type of network such a local area network (LAN), wide area network (WAN), intranet, Internet or any combination thereof. For illustrative purposes, a limited number of devices are shown in this example. The devices may be coupled to the network through one or more servers, routers, proxies, gateways, network address translation devices or any suitable combination thereof.

It should be appreciated that the invention is not limited to executing on any particular system or group of systems. Also, it should be appreciated that the invention is not limited to any particular distributed architecture, network, or communication protocol.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method of establishing a connection between a first device and a second device, comprising:
    operating, by the first device, as an access point for a wireless infrastructure network;
    broadcasting, by the first device, an advertisement invitation within a management frame over the wireless infrastructure network, wherein the advertisement invitation requests transmission of advertisements regarding services offered by other devices;
    receiving a response to the advertisement invitation from the second device, wherein the response indicates that the second device offers at least a particular type of service, and wherein the second device is a station device on the wireless infrastructure network;
    determining, by the first device, that the first device is to access the particular type of service offered by the second device;
    in response to the determination, sending, by the first device, a connection invitation within another management frame over the wireless infrastructure network, wherein the connection invitation requests that the second device initiate a connection to the first device via the wireless infrastructure network;
    receiving, by the first device, a request from the second device for the second device to connect to the first device via the wireless infrastructure network;
    accepting, by the first device, the request from the second device; and
    establishing, the connection between the first device and the second device.

2. The method of claim 1, wherein the connection invitation is embedded in an information element specified under IEEE 802.11, wherein the information element is embedded in a probe response frame specified under IEEE 802.11, and wherein the probe response frame includes a Media Access Control (MAC) address of the second device and a Basic Service Set Identifier (BSSID) of the first device.

3. The method of claim 1, wherein the connection invitation includes an address of the second device.

4. The method of claim 1, wherein the connection invitation is embedded within an information element portion of the other management frame.

5. The method of claim 1, wherein the other management frame is a probe response frame.

6. The method of claim 1, wherein the other management frame is a probe response frame, and wherein the connection invitation is embedded within an information element portion of the probe response frame.

7. The method of claim 1, wherein the wireless infrastructure network is an IEEE 802.11 infrastructure mode network.

8. The method of claim 1, wherein the wireless infrastructure network operates according to protocols that do not natively support initiation of connections by access point devices.

9. The method of claim 1, further comprising:
    employing, by the first device, the established connection to utilize the particular service offered by the second device.

10. A system for connecting to an access point of an infrastructure mode wireless network, comprising:
    a memory and a processor that are respectively configured to store and execute instructions, including instructions for:
        receiving, by a second device, a connection invitation within a management frame that was transmitted by a first device over an infrastructure mode wireless network, wherein the connection invitation requests that the second device initiate a connection to the first device, wherein the first device is an access point for the infrastructure mode wireless network, wherein the second device is operable as a station on the infrastructure mode wireless network, and wherein the connection invitation was transmitted by the first device in response to a determination by the first device that the first device is to access a service provided by the second device; and in response to the received connection invitation, establishing, by the second device, a connection to the first device through the infrastructure mode wireless network.

11. The system of claim 10, wherein the instructions also include further instructions for:
providing, by the second device, the service to the first device via the established connection.

12. The system of claim 10, wherein the instructions also include further instructions for:
prior to receiving the connection invitation, providing, by the second device, information regarding the service to the first device.

13. The system of claim 12, wherein the information regarding the service was provided to the first device in response to an advertisement invitation broadcast from the first device.

14. The system of claim 10, wherein the connection invitation is embedded in an information element of an IEEE 802.11 probe response frame, and wherein the IEEE 802.11 probe response frame includes a Media Access Control (MAC) address of the second device and a Basic Service Set Identifier (BSSID) of the first device.

15. The system of claim 10, wherein the connection invitation is addressed to the second device and is received in a probe response frame for the infrastructure mode wireless network.

16. The system of claim 10, wherein the connection invitation is received over the infrastructure mode wireless network via a unicast packet.

17. A article of manufacture having instructions stored therein for causing a first device to perform operations including:
operating, by the first device, as an access point for a wireless infrastructure network;
in response to detection of a service provided by a second device, sending, by the first device, a connection invitation within a management frame over the wireless infrastructure network, wherein the connection invitation requests that the second device initiate a connection to the first device via the wireless infrastructure network while the second device is operating on the wireless infrastructure network as a station device;
receiving, by the first device, a request from the second device for the second device to connect to the first device via the wireless infrastructure network; and
establishing, the connection between the first device and the second device.

18. The article of manufacture of claim 17, wherein the operations further include:
prior to sending the connection invitation, broadcasting, by the first device, an advertisement invitation within another management frame for the wireless infrastructure network, wherein the advertisement invitation requests transmission of advertisements regarding services offered by other devices; and
receiving, by the first device, a response of the second device to the advertisement invitation, the response including an advertisement for the service provided by the second device.

19. The article of manufacture of claim 17, wherein the wireless infrastructure network is an IEEE 802.11 infrastructure mode network.

20. The article of manufacture of claim 17, wherein the connection invitation is embedded within an IEEE 802.11 information element portion of the management frame, wherein the management frame is an IEEE 802.11 probe frame, and wherein the IEEE 802.11 probe response frame includes a Media Access Control (MAC) address of the second device and a Basic Service Set Identifier (BSSID) of the first device.

21. The article of manufacture of claim 17, wherein the wireless infrastructure network operates according to protocols that do not natively support initiation of connections by access point devices.

* * * * *